United States Patent Office 2,775,757
Patented Dec. 25, 1956

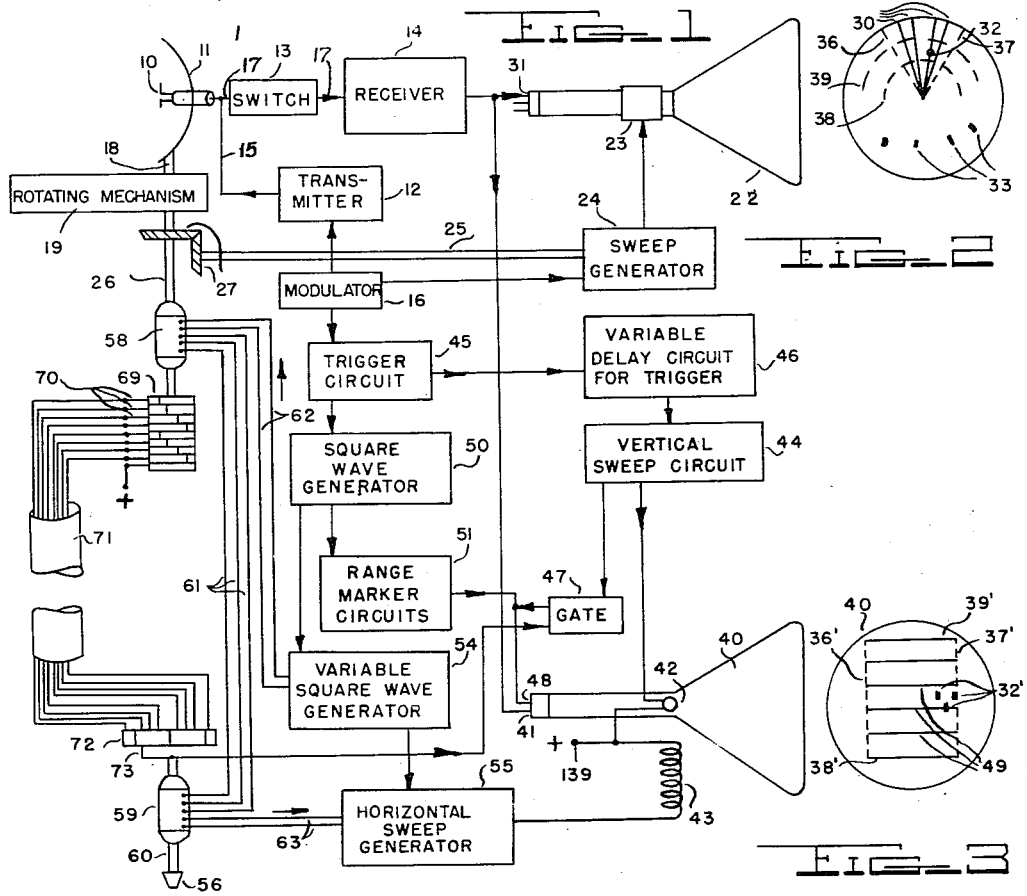

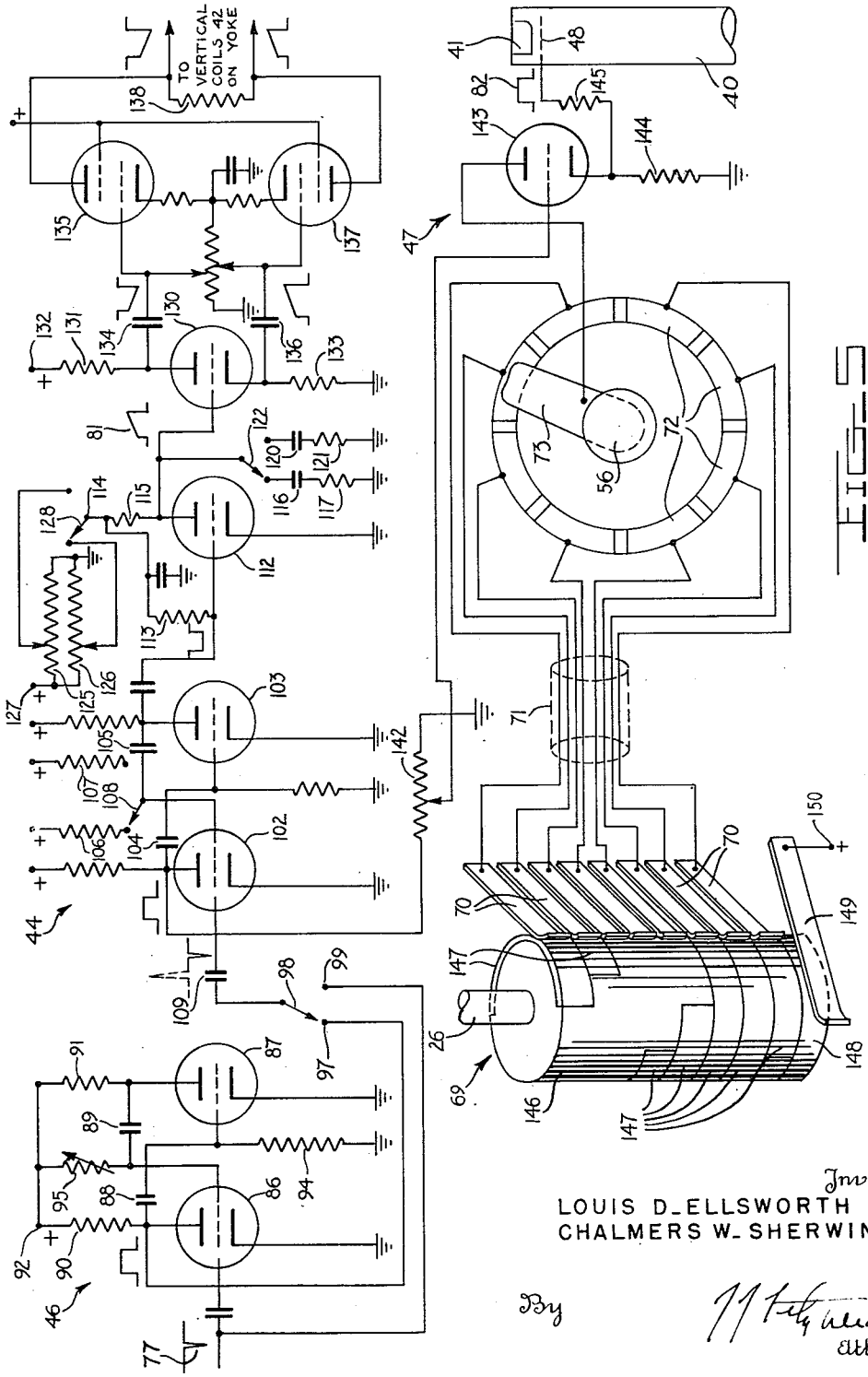

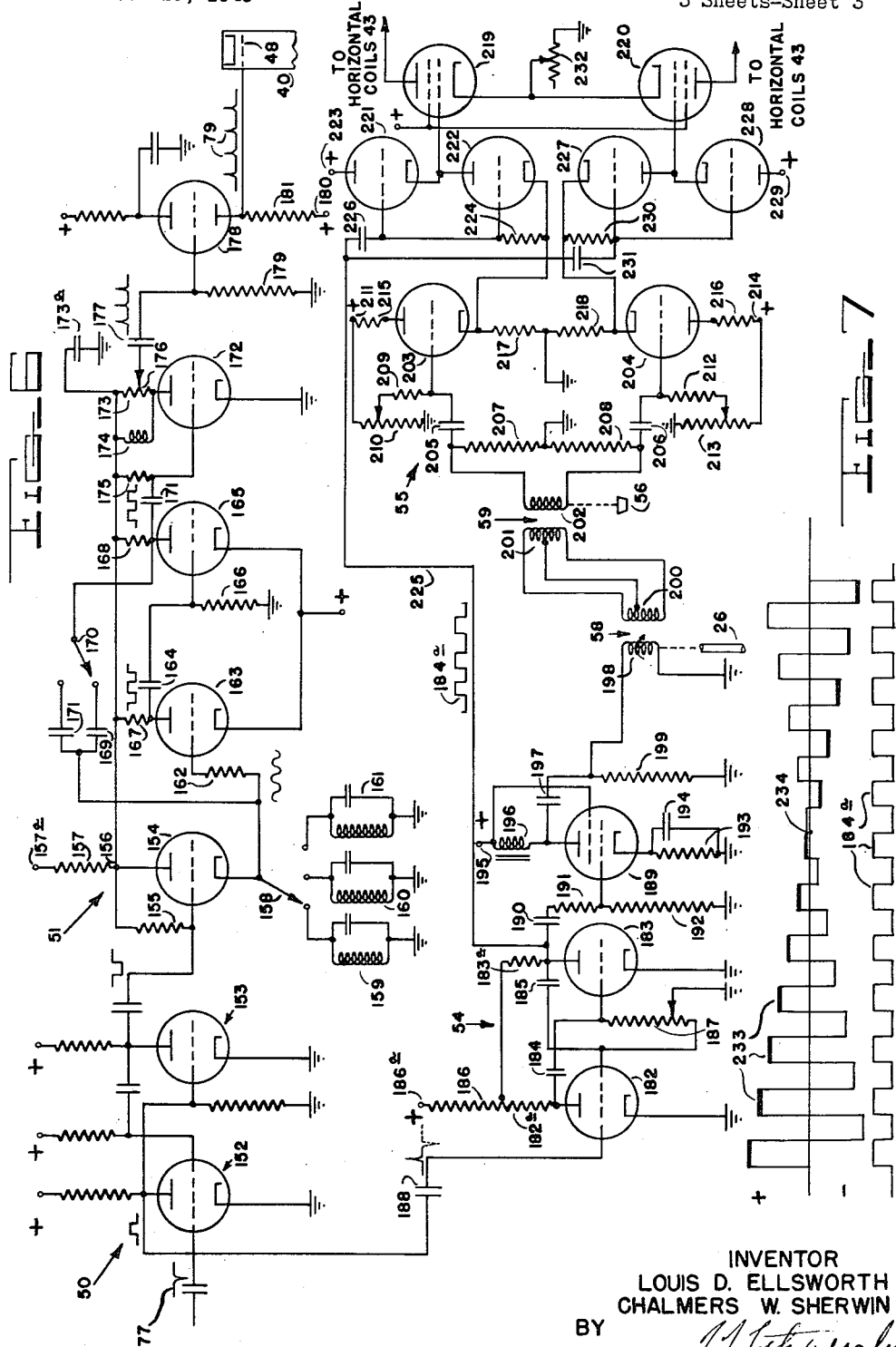

2,775,757

AUXILIARY INDICATOR FOR RADIO-ECHO DETECTION SYSTEM

Louis D. Ellsworth, Arlington, and Chalmers W. Sherwin, Belmont, Mass., assignors, by mesne assignments, to the United States of America as represented by the Secretary of the Navy Application November 19, 1943, Serial No. 510,993

8 Claims. (Cl. 343—11)

This invention relates to radio-echo detection systems and particularly to those portions of such systems which deal with the indication or representation of the information obtained by the system.

One successful system of radio-echo detection utilizes a concentrated beam of electromagnetic radiation which is modulated in discrete pulses and is caused to scan a field in space in a uniform manner about a predetermined axis. A cathode ray tube is used as the indicating device, and the electron beam thereof is caused repeatedly to sweep radially of the tube from the center to the circumference each time a pulse of radiation is transmitted, the time of the sweep corresponding to the range of the system. Means is provided whereby at all times the direction of this radial sweep will correspond to the direction of the radiated electromagnetic beam. Radiation reflected from an object in space and received by the apparatus is then caused to intensify the electron beam of the cathode ray tube, producing a spot of light on the tube which has a distance from the center of the tube corresponding to the range of the object and lies on a radial line which corresponds to the angular direction of the radiated electromagnetic beam when the reflected radiation was transmitted.

When the electromagnetic beam is rotated about a substantially vertical axis, this type of indication produces a light pattern on the face of the cathode ray tube which is substantially a plan view of the area around the transmitter within range of the apparatus, and has been referred to as a system of "plan position indication." Such a system may have a range of 50 miles or more, and it is often desirable, as where several objects are located close together at a distance from the transmitter, to see these objects in greater detail than that in which they are represented in the light pattern on the face of the cathode ray tube.

It is therefore one of the objects of the invention to provide a method and an apparatus in a radio-echo detection system for reproducing on an auxiliary indicating device an enlarged portion of the image obtained on the main indicating device.

Another object of the invention is to provide a method and a mechanism for selecting any desired portion of the field scanned by the electromagnetic beam of the system and reproducing that portion on an auxiliary indicating device.

Another object of the invention is to provide a method and a mechanism for enlarging the reproduction of the selected portion of the scanned field in either of one or two directions, or in both directions.

A more specific object of the invention is to provide circuits and mechanism for operating an auxiliary indicating device in a radio-echo detection system only during the period when the electromagnetic beam is scanning the selected portion of the field in space which is to be reproduced in enlarged form.

Still another object of the invention is to provide in a radio-echo detection system a means for producing a sweep in one direction of the electron beam of a cathode ray tube, which sweep will correspond in time duration to a selected portion of the field scanned by the electromagnetic beam of the system and will correspond in position to the direction of the electromagnetic beam in the selected portion of the field.

Other objects and objects relating to the various circuits and other parts of the apparatus and the manner of connecting and operating these parts will be apparent as the description of the invention proceeds.

The invention has been illustrated in the accompanying drawings in which:

Fig. 1 is a schematic diagram of a complete system incorporating our invention;

Figs. 2 and 3 are end views of the two cathode ray tubes used in the system of Fig. 1;

Fig. 4 is a timing diagram showing the timing of various wave forms used in the system to control the indicator;

Fig. 5 is a partly schematic circuit diagram of the circuit and associated mechanical elements for producing a vertical sweep in the auxiliary cathode ray tube, the circuit including a blanking-out circuit for preventing the electron beam from producing an illuminated spot on the face of the tube except at predetermined time intervals;

Fig. 6 is a circuit diagram of the circuit for producing and timing the horizontal sweep in the auxiliary cathode ray tube; and Fig. 7 is a wave diagram illustrating the manner in which the horizontal sweep of the auxiliary tube is produced.

Referring now more specifically to Fig. 1 of the drawings, a radio-echo detection system is indicated which comprises an antenna 10, shown as a dipole antenna, although any other device for radiating high frequency electromagnetic oscillations, as, for instance, those in the microwave region might be used. Means is provided to make the radiation directive, as, for instance, by the use of the reflector 11 which may be a paraboloid, mounted so that the antenna 10 is spaced with respect to the focal point thereof in a manner to direct a beam of electromagnetic radiation having the desired radiation pattern towards the left of the drawing out of the reflector. With this system the electromagnetic beam follows a simple scanning path, as will be explained later, and it is desirable to have the cross-section of the beam as narrow as possible in the direction of scanning, and preferably wider in a direction at right angles to the direction of scanning, so that the position of the beam in the direction of scanning may be accurately determined when objects are encountered without greatly limiting the size of the field scanned.

A suitable transmitter 12 is provided to produce the high frequency oscillation necessary to transmit the electromagnetic radiation, and this transmitter may be connected by means of a suitable transmission line 15 to the radiator 10.

The electromagnetic radiation is radiated in discrete pulses, and for this purpose a suitable modulator 16 which produces substantially square pulses is shown connected to the transmitter for modulating the high frequency oscillations of the transmitter in such a manner that the transmitter will be on during the time of each pulse but will be completely off between pulses.

In the particular system used to illustrate the invention, the same antenna is used to transmit the electromagnetic radiation and to receive the echo signal from an object in space under the control of a suitable switch 13, although it will be understood that separate antennae may be used, if desired. A receiver 14 is shown connected to the switch 13 for receiving the reflected signals when the transmitter is not operating.

The switch 13 may be of the automatic discharge type in which a pair of discharge contacts connected across the transmission line 17 to the receiver 14 is positioned a distance from the juncture of the transmission lines 17 and 15 equal to a quarter-wave length of the particular oscillations to which the system is tuned, measured on the transmission line. The transmitter 12 is arranged to present low impedance to the line 15 leading from it to the antenna when it is operating, which impedance will be the characteristic impedance of the line, but when it is not operating, the impedance is high. When the transmitter is operating, the voltage across the spark gap causes a discharge which has the effect of shorting the receiver 14, but there is no shorting effect with respect to the transmitter, because of the standing waves in the quarter-wave length section between the spark gap of the switch 13 and the transmission line 15. Hence, the energy from the transmitter passes to the antenna 10 and substantially little reaches the receiver 14. On the other hand, when the transmitter is off and the antenna 10 receives a signal, the impedance looking into the transmitter is high, while the impedance looking into the receiver is low, and the energy passes from the antenna 10 to the receiver 14. The arrangement works automatically, the receiver being short-circuited when the transmitter is operating and being effectively connected to the antenna when the transmitter is off. Any suitable type of switch may be used which will have the effect of alternately connecting the antenna to the transmitter and receiver.

In the arrangement of Fig. 1, the entire antenna system is caused to rotate about the vertical axis 18 by means of a suitable rotating mechanism 19 which may be operated by a motor, so that it turns at a substantially constant rate. It will be understood that the transmission line 15 which delivers energy to the antenna 10 will be arranged concentrically with the axis 18 and a suitable rotary joint provided to permit the antenna to rotate about the axis.

A cathode ray tube 22 is shown as the indicating device for the system of Fig. 1. This tube may have any type of deflection, but it has been indicated as a magnetic deflection tube with a yoke 23 surrounding the neck thereof, as will be well understood in the art, for producing the deflection of the electron beam of the tube in any desired direction across the face thereof. The currents for producing this deflection are produced by means of a sweep generator 24 which is connected to the modulator 16 and is controlled in some manner by the rotating mechanism 19. For simplicity of illustration the control connection to the rotating mechanism is shown as a mechanical shaft 25 connected to the rotating shaft 26 of the rotating mechanism 19 by means of suitable bevel gears 27.

Although the system may be arranged to have various types of indication, we have shown a tube in which the electron beam is caused to make a radial sweep each time a pulse of radiation is transmitted. For this purpose the pulse produced by the modulator 16 is delivered to the sweep generator 24. This radial sweep is then caused to rotate about the center of the tube as the antenna system for radiating the electromagnetic beam rotates. This is produced by the mechanical connection between the rotating mechanism and the sweep generator 24. Various means may be employed in the sweep generator 24 for producing this rotating radial sweep, but since they form no part of the present invention they will not be described in detail.

The indication produced on the face of the tube in this form of indicating device will appear somewhat as shown in Fig. 2. Here, several radial lines 30 have been indicated, although it will be understood that in practice these lines will be produced very close together so that if the electron beam were intensified sufficiently to eliminate the face of the tube they would hardly be distinguishable one from the other.

When radiation is reflected from an object in space and is picked up by the antenna it will be received before the next pulse is radiated and during the time that the transmitter is off. The time required for the pulse of radiation to leave the transmitter, strike an object in space and be reflected back from it, and be received again by the antenna 10, will be a measure of the range of the object, since the speed of the electromagnetic waves in space is known to be the same as the speed of light.

The output of the receiver 14 is connected to the grid or to some other electrode for controlling the intensity of the electron beam, as indicated at 31, and thus the reflected signal picked up by the receiver causes the electron beam to be intensified so as to produce a spot of light which will appear as the spot 32 on the face of the tube. Other objects in the field of scan will produce other spots on the face of the tube, as for instance, the spots 33. The distance any of these spots is from the center of the tube will indicate the range of the object producing it, and the angle of the radial line through the spot with respect to some reference line on the face of the tube will indicate the angle through which the antenna system 10—11 has been turned with respect to some reference position at the instant the reflected radiation was radiated from the antenna. While any type of fluorescent screen for the cathode ray tube 22 may be used, it is desirable to have one which will retain the image for the period of time required for the electromagnetic beam to make one complete cycle of its scan, so that the operator will see a substantially continuous image of the field being scanned.

The present invention is concerned with enlarging a selected portion of the field disclosed on the cathode ray tube 22, as for instance, that portion lying between the radial dotted lines 36 and 37 and between the circular dotted lines 38 and 39, this region including the large spot 32 concerning which it is desired to obtain more information, since it might be produced by a large single object or several closely positioned objects. A second auxiliary cathode ray tube 40 is arranged to reproduce the information on this small section of the other tube with better resolution. This tube may receive the signal from the receiver 14 on the cathode of the tube, the terminal of which is indicated at 41. The indication on this tube may or may not be produced in the same manner as that on the main tube 22. We may prefer to produce the indication on the tube 40 by a vertical sweep which is timed by the radiated pulse and a horizontal sweep which is controlled by the direction of the radiated electromagnetic beam.

The tube 40 is shown provided with a vertical deflecting coil 42 and a horizontal deflecting coil 43. These will be provided in pairs for push-pull operation and will normally be arranged in a suitable yoke, as will be understood. Current for the vertical deflecting coil 42 is provided from a vertical sweep circuit 44 which is controlled from the modulator 16. Since it is desired to obtain that portion of the main indication which lies radially of the main indicator tube between the lines 38 and 39, it will be necessary to start the vertical sweep from the bottom of the tube 40 at the time when the radial sweep in the tube 22 has reached the line 38 in moving from the center of the tube towards the circumference. In order to do this and also to provide an adjustment so that the point at which the vertical sweep starts may be changed at will to obtain different portions of the field of the main indicating tube, a trigger circuit 45 is operated from the modulator 16 and produces a short trigger impulse. This trigger circuit controls another circuit 46 which is in effect a variable delay circuit for the trigger which then starts the vertical sweep circuit 44 in addition to controlling a gate circuit 47. The latter applies a positive pulse to some suitable portion of the receiver or cathode ray tube, as, for instance, the control grid of the cathode ray tube 40, the terminal of which is indicated at 48, in order to permit the electron beam of the cathode ray tube to be intensified by a signal during the time of the pulse which is the same as the time required for the beam to move from the bottom to the top of the tube under control of the vertical sweep circuit. At all other times a signal will be unable to intensify the beam so as to produce a light spot.

In order to estimate the range more accurately from an inspection of a spot of light on the face of the tube it is desirable to have some kind of range marker lines 49 which will be spaced at regular known intervals across the face of the tube, as, for instance, distances corresponding to one mile, two miles, or five miles. This is especially desirable, since provision is made, as will be explained later, to change the scale of the indication by the mere throwing of a switch. In order to control these range markers, as well as the vertical sweep, a square wave generator 50 is operated under control of the trigger produced by the trigger circuit 45, and this square wave generator controls the range marker circuits 51, the output of which is connected to the control grid of the cathode ray tube at the terminal 48.

An additional square wave generator 54 is controlled from the square wave generator 50 and is arranged so that the positive portion of the wave may be varied in width, i. e. time duration, in order to control the amplitude of the electron beam sweep in the horizontal direction in a manner to be explained later. The horizontal sweep generator 55 is controlled by the square wave generator 54 and also by the rotation of the antenna system as compared to the position of a manually operated knob 56. In order to accomplish this control, a rotary transformer or phase adjusting device 58 is arranged with its shaft connected to the shaft 26 of the rotating mechanism 19. This rotary transformer 58 should be capable of passing a square voltage wave and may consist of a three phase stator winding and a rotor winding, the latter being mounted with respect to the former so that rotation of the rotor will vary the inductance between the rotor winding and the stator winding and a square voltage wave of constant amplitude, applied across the rotor winding will induce a voltage in the stator winding which will vary sinusoidally as the rotor rotates and will reverse in phase every 180 degrees of rotation. A second similar rotary transformer 59 may be supported in front of the operator, the shaft 60 thereof being attached to the knob 56, so that the position of the rotor may be adjusted thereby. The stator windings of these two rotary transformers 58 and 59 are connected together, as indicated, by the wires 61. The rotor winding of the rotary transformer 58 is connected by means of the wires 62 to the square wave generator 54 and a square wave voltage at the frequency of the repetition rate of the pulse radiated by the antenna system is fed through the rotor winding. The rotor winding of the rotary transformer 59 is connected by means of the wires 63 to the horizontal sweep generator 55 and controls the horizontal sweep in a manner to be described later.

Since, in the example given, it is desired to reproduce that part of the main indication which lies on the tube 22 between the lines 38 and 39 and the lines 36 and 37, it is necessary to blank-out the tube 40 so that no signals can be reproduced when the antenna system is pointing in any direction which would not correspond to a radial line included between the two radial lines 36 and 37. In order to accomplish this purpose, we use a commutator 69 which consists of a plurality of conducting segments attached to the shaft of the rotary transformer 58 and provided with a plurality of brushes 70 which are connected through a cable 71 to stationary segments 72 engaged by a brush 73 which is attached to the shaft of the rotary transformer 59 and is therefore under control of the knob 56. This brush 73 is connected to the gate 47 and causes it to be effective during a particular 180 degrees of the rotation of the antenna system which may be made to include the particular section of the field being reproduced on the tube 40. These specific commutator arrangements will be described later in connection with Fig. 5.

The enlarged indication on the face of the tube 40 will appear somewhat as indicated in Fig. 3. Here the line 38' will represent the line 38 of Fig. 2 and the line 39' will represent the line 39 of Fig. 2, while the vertical lines 36' and 37' will correspond to the lines 36 and 37 of Fig. 2. The spot 32 appearing in the tube 22 might then appear as several spots 32', where several objects are located in that position in the field being scanned but are too close together to appear as individual spots on the tube 22. For the auxiliary tube 40 a fluorescent screen capable of retaining the image for a period of time sufficient to complete a cycle of scanning of the electromagnetic beam is also desirable to present a continuous image of the selected portion of the scanned field.

In Fig. 4 the various events which take place in the circuit are shown plotted against a horizontal time base. The square pulse 76 represents the square pulse produced by the modulator 16 which controls the transmitter, and hence represents also the pulse of radiation sent out by the antenna system. The repetition rate of this pulse may be arbitrarily chosen, except that adjacent pulses must be far enough apart in time to permit the radiation to move out to the object and to be reflected back again. Thus, the maximum range of the system will determine the minimum spacing of the pulses.

The trigger circuit 45 produces the sharp trigger impulses 77 which may be produced by the leading edge of the pulse 76, or the trailing edge, or may be delayed, if desired, a predetermined time after the pulse 76. The trigger impulse 77 starts the operation of the square wave generator 50 which produces the long positive square pulse 78, the time duration of which determines the time in which the range marker circuits function. The range marker circuits 51 produce a plurality of positive pips 79 which are so timed that they will appear upon the face of the tube accurately to mark the range. These pips are produced during the square wave pulse 78 and may be changed to give different spacing in a manner to be described later.

The variable delay circuit 46 is in effect a square wave generator which is started by the trigger impulse 77 and produces the square wave 80, the trailing edge of which in turn starts the vertical sweep 81 which is produced by the vertical sweep circuit 44. Means is provided to adjust the time duration of the square wave 80 or eliminate the effect of it entirely, so that the vertical sweep 81 may be started when the pulse 76 starts, or at any time later than that, so as to select the desired portion of the scanned field. The gate for the cathode ray tube which is produced by the gate circuit 47 is represented in Fig. 4 by the square wave 82 which is also started by the variable width gate 80.

In Fig. 5 the circuits 46—44 for producing the vertical deflection currents are shown together with the circuit 47 and commutator 69 for producing the gate by which the cathode ray tube is controlled. The circuit 46 comprises a modified multivibrator circuit which is arranged for producing a very accurately timed square pulse. Any circuit which effects an accurate delay of the trigger impulse might be used for the circuit 45, but the delay produced should be accurately controlled, since this controls the start of the vertical sweep circuit. As shown, the circuit comprises two tubes 86 and 87, which may be triodes, with the plate of the tube 86 coupled to the grid of the tube 87 through a condenser 88, and the plate of the tube 87 coupled to the grid of the tube 86 through a condenser 89. The plates of the two tubes 86 and 87 are provided with plate resistors 90 and 91, respectively, which resistors are connected to a suitable source of positive potential, indicated at 92. The cathodes of the tubes 86 and 87 are connected to ground and the grid of the tube 87 is connected through a resistance 94 to ground. However, the grid of the tube 86 is connected through a variable resistance 95 to the source of potential 92.

The values of the components of the circuit are such that the tube 86 is normally conducting and the tube 87 non-conducting. When a negative trigger impulse 77 from the trigger circuit 45 is applied to the grid of the tube 86 it will shut off this tube and cause the tube 87 to conduct, this condition being maintained until the condenser 89, which has previously been charged because of grid current in the tube 86, has discharged sufficiently to permit the grid of the tube 86 to rise in potential under the influence of the source 92 sufficiently to permit this tube to conduct again, which will thereupon shut off the tube 87. When the values of the components are properly chosen, the adjustment of the resistor 95 will vary the time duration of the square pulse produced by this multivibrator circuit.

The output of the circuit 46 may be taken from the plate of the tube 86 and is shown connected to one terminal 97 of a two-way switch 98, the other terminal 99 of which is connected directly to the trigger circuit, as indicated, so that it will receive the trigger impulse 77 from that circuit. By means of the switch 98 either the negative trigger 77 or the output of the multivibrator 46 may be delivered to the circuit 44.

The circuit 44 also contains a modified multivibrator comprising the two tubes 102 and 103, these tubes being connected similarly to the tubes 86 and 87 with the plate of the tube 102 connected to the grid of the tube 103 through a condenser 104 while the plate of the tube 103 is connected to the grid of the tube 102 through a condenser 105. However, with this multivibrator we provide two resistors 106 and 107, instead of the single variable resistance 95 in the circuit associated with the tubes 86 and 87, and provide a switch 108 for connecting either resistor, as desired, between the source of positive potential and the grid of the tube 102. The resistors 106 and 107 are given values so as to provide two fixed operating times for the circuit, these times corresponding in duration to two particular ranges, as, for instance, five miles and ten miles, on the face of the cathode ray tube 40. The resistors which represent these ranges are chosen arbitrarily and of course other resistors may be provided to provide other ranges.

The grid of the tube 102 is fed through a small condenser 109 which acts to differentiate the square wave produced by the circuit 46 when the switch 98 is in the position shown, so that a positive impulse corresponding to the leading edge of the square wave is applied to the grid of the tube 102 and also a negative impulse corresponding to the trailing edge. Since the tube 102 is operating full on by virtue of the potential maintained on the grid thereof, the positive impulse will have no effect on the multivibrator circuit. However, the negative impulse produced at the trailing edge of the square wave will shut off the tube 102 and thus start the production of another square wave which will have a time duration depending on the position of the switch 108 and corresponding to a particular range, as, for instance, ten miles. The solid line saw-tooth 81 of Fig. 4 represents the ten mile sweep as determined by this multivibrator, while the dot-and-dash line 110 represents the five mile sweep.

The negative square wave developed on the plate of the tube 103 is delivered to the grid of a saw-tooth generator tube 112. This may be any type of saw-tooth generator which will produce a saw-tooth wave suitable for deflecting the electron beam of the cathode ray tube. In Fig. 1 a cathode ray tube 40 has been shown which utilizes magnetic deflection, and, in this case, it is desirable to produce a saw-tooth wave having a steep front, as indicated at 81 in Figs. 4 and 5, in order to drive the current through the inductance of the deflecting coil. In the arrangement shown, the tube 112 is maintained conducting by connecting the grid thereof through a resistance 113 to a source of potential, indicated at 114, which also supplies the plate of the tube through a resistance 115. The plate is also connected through a condenser 116 in series with a resistor 117 to ground.

When the negative square wave pulse is applied to the grid of the tube 112 the tube is shut off, whereupon the plate of the tubes rises abruptly. Thereupon, the condenser 116 begins to charge and the voltage of the plate slowly increases along the saw-tooth wave 81. At the end of the negative square pulse the tube 112 begins to conduct again and the condenser 116 is discharged through the tube, producing the steep trailing edge of the saw-tooth wave. A second condenser 120 in combination with a resistor 121 may be connected to the plate of the tube 112 in place of the condenser-resistor combination 116–117 by means of a switch 122, these two condenser-resistor combinations being provided to produce either the ten mile saw-tooth sweep or the five mile saw-tooth sweep, as desired, since the rate of charge will be different for the two different sweeps.

The amplitude of the saw-tooth wave produced by the particular saw-tooth generator 112 is directly proportional to the plate voltage, and hence we provide means to adjust this voltage so that the proper amplitude may be obtained and preferably to adjust it independently for each of the five and ten mile saw-tooth sweeps. To this end we use two potentiometers 125 and 126 the windings of which are connected in parallel between a source of potential 127 and ground. The arms of these potentiometers are then connected to the two terminals of a two-way switch 128 the arm of which forms the source of potential 114, already referred to. By placing the arm of the switch 128 on one terminal, the potential necessary for the proper amplitude of one of the sweeps may be obtained, while by shifting the switch to the other terminal the proper amplitude for the other sweep may be obtained, and both of these amplitudes may be independently adjusted by adjusting the arms of the potentiometers 125 and 126.

The saw-tooth wave produced by the saw-tooth generator 112 is then applied to the grid of a tube 130 which amplifies the saw-tooth wave and acts as a phase splitter to produce a negative wave on the plate of the tube and a positive wave on the cathode. To this end the plate is connected through a resistance 131 to a source of potential, indicated at 132, while the cathode is connected through a resistance 133 to ground. The negative saw-tooth wave on the plate of the tube 130 is delivered through a condenser 134 to the grid of a power amplifier tube 135, while the positive saw-tooth wave on the cathode of the tube 130 is delivered through a condenser 136 to the grid of another power amplifier tube 137. The plates of the power tubes 135 and 137 are then connected through separate vertical deflecting coils 42 on the neck of the cathode ray tube 40 to a source of positive potential, indicated at 139 in Fig. 1, thus providing a push-pull arrangement for the vertical deflection of the electron beam. A resistor 138 may be connected across the vertical deflecting coils in order to provide the proper impedance match for the tubes and to damp the circuit to prevent oscillations.

It will be understood that, when push-pull deflection is used, there will be two vertical deflecting coils producing opposed magnetic lines of force through the neck of the tube. As the field strength of one magnetic field increases under control of the positive saw-tooth wave, the field strength of the other decreases under control of the negative saw-tooth wave.

The gate circuit 47 of Fig. 1 for producing the gate pulse 82 of Fig. 4 is also under control of the multivibrator circuit 44 comprising the tubes 102 and 103. For this purpose a positive pulse is taken from the plate of the tube 102 and is passed through the resistance of a potentiometer 142 to ground. The arm of the potentiometer is connected directly to the grid of a tube 143, the output of this tube being taken from the cathode which is connected through a resistance 144 to ground. The output is delivered through a resistance 145 to the control grid 48 of the cathode ray tube 40.

As long as a suitable positive potential is applied to the plate of the tube 143, positive square wave pulses 82 will be delivered to the control grid of the cathode ray tube, thus permitting the signal from the receiver 14, which is connected to the cathode 41 of the cathode ray tube, to intensify the electron beam when reflected radiation is received during the period of the square wave 82 which, as is shown in Fig. 4, has a time duration equal to the vertical sweep 81.

However, a positive potential is not always available at the plate of the tube 143, but is intermittently applied by the commutator connections 69 to 73 inclusive. The commutator 69 may comprise a cylindrical element 146 mounted on the shaft 26 of the rotating mechanism 19, so that it rotates with it. The body of the commutator may be made of insulating material to support a plurality of metallic segments 147 which extend around the circumference of the cylinder 69 for approximately 180 degrees and are spaced side by side and electrically connected together. The segments, however, are staggered around the circumference of the cylinder, the spacing depending on the number of segments used. For simplicity of illustration we have shown eight of these segments, but it will be understood that more might be used if desired. We have found that 16 segments will give good results. At the end of the commutator a circular band 148 of metal may be provided which is electrically connected to the segments 147. By means of this band, a positive potential is applied to all of the segments 147 at all times through a brush 149 which bears against the band and is connected to a source of positive potential, indicated at 150. Thus, all of the segments 147 are energized at all times, but, since each is only 180 degrees in circumference, the brushes 70 which bear against the segments will have the positive potential applied to them for only 180 degrees rotation of the commutator, and each of the brushes 70 will be energized during a different 180 degrees rotation, depending on the number of segments used.

The brushes 70 are connected by suitable wires which pass through a cable 71 to the stationary segments 72 positioned somewhere within reach of the operator of the apparatus. These segments 72 are engaged by a contact arm 73 which may be adjusted by the operator by means of the knob 56 which also controls the rotor of the selfsynchronous motor 59.

It will be seen, that, when the operator sets the arm 73 upon a particular segment 72, by means of the knob 56, this particular segment will receive a positive potential to energize the tube 143 only during a particular 180 degrees rotation of the antenna system. During this particular 180 degrees rotation, the gate 82 will operate to intensify the electron beam sufficiently, so that signals from the receiver may be observed on the tube during the period of the gate, but no signals will be observed during the other 180 degrees rotation of the antenna system when the particular segment on which the arm 73 is resting is not energized.

In Fig. 6 the square wave generator 50, the range marker circuit 51, the variable square wave generator 54, the two rotary transformers 58 and 59, and the horizontal sweep generator 55 are shown. The square wave generator 50 is a multivibrator circuit comprising the two tubes 152 and 153, connected similarly to the multivibrator circuits already described, but arranged to produce the long negative square wave pulse 78 of Fig. 4. This square wave is long enough to include the vertical saw-tooth wave regardless of where it is shifted along the time base of Fig. 4 and determines the time during which the range marker pips are produced.

The negative square wave from the plate of the tube 153 is delivered to the grid of a tube 154 which is maintained conducting by connecting the grid thereof through a resistor 155 to a terminal 156 which is connected through a resistance 157 to a source of potential, indicated at 157a. The plate of the tube 154 gets its potential from the terminal 156. The cathode of this tube 154 is connected to the arm of a switch 158, which, in the example shown, is provided with three contact terminals connected to oscillating circuits 159, 160, and 161 which are connected between these contact terminals and ground. These oscillating circuits have periods corresponding to 1 mile, 2 miles and 5 mile range periods. In other words, oscillations in one of these circuits at the resonant frequency will have cycles equal in time duration to the time required for the electromagnetic radiation to pass to and be reflected back from an object which is one, two or five miles from the transmitter, depending on the particular oscillating circuit. These particular ranges are arbitrarily chosen and other oscillating circuits may be provided to give still other range pips.

The cathode of the tube 154 is directly connected through a resistance 162 to the grid of a tube 163, the plate circuit of which is coupled through a condenser 164 to the grid of a tube 165. A grid-leak resistance 166 connects this grid to ground. The tubes 163 and 165 are given suitable plate potentials from the terminal 156 through load resistors 167 and 168 respectively. The plate of the tube 165 is then connected back to the grid circuit of the tube 163 through a condenser 169. In order to change the value of this condenser for the various oscillating periods, this connection may be made through a switch 170 by means of which one or more other condensers, as, for instance, the condenser 171, may be connected in place of the condenser 169, these condensers, as will be understood, having different values. The cathodes of the tubes 163 and 165 are connected together and may be given a slight positive bias potential normally to maintain the tubes at a desired condition of operation.

In the operation of this portion of the circuit including the tubes 154, 163, and 165 the negative square pulse from the square wave generator 50 shunts off the tube 154 and the sudden cessation of current through one of the coils of the oscillating circuits 159, 160, or 161, depending on the position of the switch 158, will cause the particular oscillating circuit to be shocked into oscillation. A sine wave oscillation will then appear on the grid of the tube 163 which will be amplified in the tube 165 and applied to the grid of the tube 163 again in phase with the voltage on that grid. This action tends to drive the tube 163 towards saturation and effectively squares the wave, so that substantially square wave pulses appear on the plate of the tube 165.

These pulses are delivered through a condenser 171 to the grid of a tube 172, the cathode of which is connected to ground and the plate of which is connected through a resistance 173 which is shunted by an inductance 174 to the source of positive potential at the terminal 156, this source being also connected to ground through the bypass condenser 173a. The grid of the tube 172 is biased through a resistor 175 to the source of positive potential at the terminal 156. By means of this arrangement the tube 172 is normally maintained conducting with a constant potential between the grid and plate. The positive changes in potential caused by the square wave applied to the grid will have little effect on the output of the tube, but the negative changes will cut off the tube, causing the inductance 174 to produce positive pips of voltage, a proportion of which is taken from the resistor 173 by means of an adjustable contact 176 and fed through the condenser 177 to the grid of the tube 178, this grid being connected to ground through a resistance 179. The cathode of this tube is given a slight positive potential from a source, indicated at 180, through a resistor 181 across which the positive range pips 79 are produced to be delivered to the control grid 48 of the tube 40.

In the operation of this entire circuit, the negative square wave 78, delivered to the grid of the tube 154, shuts off the tube which shocks into oscillation one of the oscillating circuits 159, 160, and 161, whichever is connected by the switch 158. The oscillation, thus produced, passes through the tubes 163 and 165 and appears as a substantially square wave on the grid of the tube 172. This tube produces the pips 79 which are amplified by the tube 178 and applied to the control grid 48 of the cathode ray tube 40. Each sweep of the electron beam will then have a number of bright spots evenly spaced on the face of the tube, forming the range-marker lines 49 shown in Fig. 3. At the end of the square pulse, delivered by the square wave generator 50, the tube 154 becomes conducting again, which causes constant current to flow through the oscillating circuit and causes the condenser therein to charge and hold the potential constant, so as to stop the oscillation. The range pips 79 will therefore be produced during the period of the negative square pulse 78 produced by the square wave generator 50, and therefore, regardless of position of the vertical sweep along the time base of Fig. 4, the range marker lines 49 will always be present in their proper selected positions.

In order to produce the horizontal deflection sweep for the electron beam of the cathode ray tube, the square wave generator 54 is started by means of a positive impulse received from the plate circuit of the tube 152 which forms the first tube of the square wave generator 50. The square wave generator 54 comprises the tubes 182 and 183 which form a multivibrator circuit somewhat similar to those already described. The plate of the tube 182 is coupled through a condenser 184 to the grid of the tube 183, while the plate of the tube 183 is coupled through a condenser 185 to the grid of the tube 182. The plates of the tubes 182 and 183 are connected respectively through the resistors 182a and 183a and through the common resistor 186 to a source of potential, indicated at 186a. The resistance of a potentiometer 187 is connected between the grids of the tubes 182 and 183 and the arm of the potentiometer is grounded. The cathodes of the tubes 182 and 183 are connected directly to ground.

The grid of the tube 182 is connected to the plate of the tube 152 through a small condenser 188 which has the effect of differentiating the square wave to produce a positive impulse at the leading edge of each positive square wave pulse. The tube 182 is operated at cut-off, so that the negative impulse produced by the trailing edge of a positive square wave pulse from the plate of the tube 152 has little or no effect on it. The positive impulse, however, causes the tube to conduct, which, because of the condenser 184, coupling the plate of the tube 182 to the grid of the tube 183, causes the tube 183 to shut off. This, in turn, because of the condenser 185, connected between the plate of the tube 183 and the grid of the tube 182, increases the potential of this grid driving the tube 182 to its maximum conductive condition.

Normally, with the tube 182 not conducting the condenser 184 is charged, the charging circuit including the common resistance 186, the plate resistance 182a of the tube 182, and that portion of the potentiometer resistance 187 between the grid of the tube 183 and the arm of the potentiometer. When the tube 182 becomes conductive and the tube 183 non-conductive, the condenser 184 starts to discharge through the tube 182, and after a period of time, depending on the value of the condenser 184 and the amount of potentiometer resistance 187 in the condenser circuit, the grid of the tube 183 will become positive enough for this tube to conduct, whereupon the tube 182 will be shut off again and will remain shut off until the next positive pulse from the plate of the tube 152. Since the time it takes the condenser 184 to discharge is dependent upon the resistance between the grid of the tube 183 and ground, by varying this resistance, the width, i. e., time duration, of the positive pulse of the square wave 184a which appears on the plate of the tube 183 may be adjusted. The purpose of this adjustment will be described later.

The positive square wave from the plate of the tube 183 is applied to a shunt fed screen grid amplifier tube 189 through a condenser 190 and resistor 191, a grid resistor 192 being connected between the grid of this tube and ground. The tube is biased by a cathode resistor 193, shunted by a by-pass condenser 194. The screen of the tube is given a positive potential from a source, indicated at 195, and the plate is supplied from the same source through an inductance 196. The square wave potential appearing on the plate of this tube is applied through a condenser 197 to one end of the rotor winding 198 of the rotary transformer 58, the other end of this winding being connected to ground and the winding being shunted by a resistor 199 in order to provide the proper damping and impedance match. The inductance 196 shown connected between the plate of the tube 189 and the source of potential 195, is used to provide a positive pip on each square wave so as to obtain a more accurate square wave current in the rotor coil 198 of the rotary transformer 58.

This rotary transformer 58, it will be understood, is connected to the rotating mechanism 19 for the antenna system, and the position of the rotor coil 198 with respect to the stator coil 200 will be determined by the anguular direction of the antenna system about the vertical shaft. The stator winding 200 of the rotary transformer 58 is connected directly by means of the wires 61 to the stator winding 201 of the rotary transformer 59. The rotor shaft of this rotary transformer is controlled by the knob 56, and the position of the rotor winding 202 of this rotary transformer will be determined by the setting of this knob. The output of the rotor winding 202 of the rotary transformer 59 is used to provide the substantially saw-tooth waves which are applied in push-pull to the horizontal deflecting coils to produce the horizontal deflection in the cathode ray tube.

The horizontal sweep generator 55 comprises two tubes 203 and 204, the grid of the tube 203 being connected to one end of the rotor winding 202 through a condenser 205, while the other end of the rotor winding is connected to the grid of the tube 204 through a condenser 206. The rotor 202 is shunted by two resistors 207 and 208 which are substantially equal in value. The juncture of these resistors is connected to ground. The amount of current flowing through the tubes 203 and 204 is adjusted by adjusting the positive potential maintained on the grids of these tubes. This is done by connecting the grid of the tube 203 through a resistor 209 to the arm of a potentiometer 210 which is connected between a positive source of potential indicated at 211 and ground. Similarly the grid of the tube 204 is connected through a resistor 212 to the arm of a potentiometer 213 which is connected between a source of positive potential indicated at 214, and ground. By adjusting these potentiometers the desired amount of plate-cathode current can be maintained normally in the tubes 203 and 204. The plates of the tubes 203 and 204 are connected through resistors 215 and 216, respectively, to the sources of potential 211 and 214 and these tubes have cathode resistors 217 and 218 connected between the cathodes and ground. The output is taken from across these resistors.

The signal developed on the cathode of the tube 203 is finally delivered to the control grid of a power amplifier tube 219 and the signal developed on the cathode of the tube 204 is finally delivered to the control grid of a power amplifier tube 220. However, these signals pass through selecting circuits which act to apply certain predetermined portions of the square wave to the grids of the amplifier tubes. The selecting circuit for the tube 219 comprises the two tubes 221 and 222 the cathode of the tube 221 being connected to the control grid of the tube 219 and the plate of the tube 222 being also connected to this control grid. The plate of the tube 221 is given a low positive potential from a source, indicated at 223, while the cathode of the tube 222 is connected to the cathode of the tube 203 to receive the signal which appears thereon. The grids of the tubes 221 and 222 are connected together and to the cathode of the tube 222 through a resistor 224 and the square wave 184a developed by the multivibrator circuit of the tubes 182 and 183, is also applied by means of a wire 225 to the grids of the tubes 221 and 222 through a coupling condenser 226.

In a like manner, the selecting circuit for the tube 220 comprises the tubes 227 and 228, the cathode of the tube 228 and the plate of the tube 227 being connected together and to the control grid of the power amplifier tube 220. The plate of the tube 228 is supplied with a low voltage positive potential from a source, indicated at 229, and the cathode of the tube 227 is connected directly to the cathode of the tube 204. The grids of the tubes 227 and 228 are connected together and through a resistor 230 to the cathode of the tube 227. These grids are also connected through a condenser 231 to the wire 225, so that the grids receive the square wave 184a produced on the plate of the tube 183 forming part of the square wave generator 54.

The cathodes of the two power amplifier tubes 219 and 220 are connected together and through a suitable adjustable resistor 232 to ground. It will be understood that two of the horizontal deflecting coils 43 will be used for push-pull operation and the plates of the tubes 219 and 220 are then connected to one end of each of these horizontal deflecting coils 43, the other ends of the coils being connected to a source of positive potential indicated at 139 in Fig. 1.

In the operation of this horizontal deflection circuit, it will first be understood that the rotor of the rotary transformer 59 is set in some particular position by the operator adjusting the knob 56. This rotor will then remain stationary until another adjustment is desired. The rotor of the rotary transformer 58, on the other hand, is continuously rotating, as the antenna system 10—11 continuously rotates about the vertical axis 18 to scan the field in space. The amplitude of the square wave applied to the rotor 198 is substantially constant, but, because of the relative movement between the rotor winding 198 and the stator winding 200, the output of the rotor 202 of the rotary transformer 59 will vary in amplitude sinusoidally, the amplitude being maximum when the two rotors bear the same angular relation to their respective stators and falling to zero when the rotor 198 reaches the 90 degree angle from this position. For every 360 degrees of rotation of the rotor 198 the amplitude of the square wave output of the rotor 202 will pass through zero potential twice at positions 180 degrees apart. The phase will also reverse each time the zero point is passed, because the rotor reverses itself within the stator winding.

In Fig. 7 the square wave 233 is intended to represent the square wave output of the rotor 202. As the rotor 198 of the rotary transformer 58 rotates beyond the point of maximum amplitude, the amplitude of this square wave will decrease as indicated in the drawing, until zero amplitude has been reached at a point indicated at 234. At this point, the rotor 198 will be in a position with respect to its stator 200 which will be at right angles to the position of the rotor 202 of the rotary transformer 59 with respect to its stator 201. Thereupon, as the rotation continues, the phase changes and the square wave increases in amplitude in the opposite phase towards the right of the figure.

The square wave 184a, shown in Fig. 7 below the square wave 233, represents the constant amplitude wave produced on the plate of the multivibrator tube 183 and delivered by means of the wire 225 to the grids of the tubes 221, 222, 227, and 228 of the selecting circuits. When the grids of these tubes are made positive by the positive half of the square wave 184a, they become conductive and the plate-cathode resistance in them drops to a low value, thereby producing on the grids of the tubes 219 and 220 whatever potential appears on the cathodes of the tubes 222 and 227, respectively. If during the positive half of the square wave 184a, the grid of the tube 219 is more positive than the cathode of the tube 222, then current will flow from the plate of the tube 222 to the cathode thereof, until the potential is equalized. In like manner, if the grid of the tube 219 is more negative than the plate of the tube 221, current will flow from the plate of the tube 221 to the cathode thereof, to equalize the potential on the grid of the tube 219. The same thing applies to the operation of tubes 227 and 228. The result of this action is that each time the positive half of the square wave 184a swings the grids of these selecting circuit tubes positive, they act to clamp the grids of the tubes 219 and 220 to the potentials on the cathodes of the tubes 222 and 227 respectively.

From an inspection of Fig. 7 it will be seen that the potentials on the cathode of the tube 222 at these particular time intervals will be represented by the positive portions of the square wave 233 from the left of Fig. 7 down to the point 234. From this point on to the right of the figure, the phase of the square wave 233 having changed, the negative halves of the square wave 233 will correspond to the positive portions of the square wave 184a. Thus the potential of the cathode of the tube 222 will start at the left of Fig. 7 with a maximum positive potential and this potential will go down towards zero in a series of steps, indicated by the heavy lines at the top of the square wave pulses, until the point 234 is reached, whereupon the cathode will continue to become more negative in a series of steps, as indicated by the heavy lines, as the amplitude of the square wave 233 increases again.

The operation of the tubes 227 and 228 is the same but the square wave 233 will be opposite in phase when applied to the cathode of the tube 227. Thus, this cathode will start with a maximum negative potential and this potential will rise in a series of steps, until the zero point 234 is reached, whereupon the potential will keep on rising in the positive direction in a series of steps as the amplitude of the wave increases.

It is believed that the grid capacities of the tubes themselves and the associated wiring act to maintain the particular potentials on the grids of the tubes 219 and 220 from one cycle to the next. At any rate, the effect of the tubes 219 and 220 is to produce currents in the deflecting coils which change amplitude in a series of steps and cause the electron beam of the cathode ray tube to sweep across the face of the tube from side to side. The potentiometers 210 and 213 are adjusted until the zero point 234 of the square wave signal 233 causes the electron beam to appear at the center of the tube. Thereupon the center of the tube will correspond to the center of the particular 180 degrees segment of the scanning antenna 10—11 which has been selected by the knob 56 and switch arm 73.

The varying square wave 233 of Fig. 7 is produced through 180 degrees of the antenna rotation; that is it falls from a maximum to zero and then rises to a maximum again within the particular 180 degrees selected. However, it is desired to produce the indication on the cathode ray tube through an angle much less than 180 degrees, as, for instance, the angle between the dotted lines 36 and 37 of Fig. 2. The minimum angle which can be represented on the cathode ray tube 40 will be determined by the deflection sensitivity of the tube and the ability of the rotary transformers to produce a rapid change of voltage with a slight change in angles of the rotors. Normally the electron beam will start its sweep, for instance, way off of the face of the tube to the left, and the beam will subsequently strike the face of the tube, cross the face and leave the right side of the face before the square wave 233 has risen to its maximum value again. If the fall and rise of the square wave 233 is very rapid it will be seen that the period of time during which the electron beam strikes the face of the tube will be small compared to the total time period, and thus a small angle of the sweep may be reproduced. Fig. 7 therefore, may represent only this small portion of the varying square wave which maintains the electron beam on the face of the tube, but it will be understood that the figure is greatly exaggerated as to the width of the particular half waves. There will be many, many more of these waves which guide the beam across the face of the tube than have been indicated in the figure.

As has already been previously stated, the time duration of the individual positive pulses of the square wave 184a produced by the square wave generator 54 may be adjusted by adjusting the potentiometer 187. Since these positive pulses control the selecting tubes 221, 222, 227, and 228 and also the time duration of individual pulses of the wave modulated by the rotary transformers 58 and 59, the time duration of the individual potential pulses applied to the grids of the tubes 219 and 220 is also controlled by the potentiometer 187. Because the potentials on the grids of the tubes 219 and 220 which feed the horizontal deflecting coils depend on repeated successive potential pulses, spaced apart in time duration and determined by the amplitude of the square pulses coming through the rotary transformers 58 and 59, it follows, that if the time each of these pulses remains on the grids of the tubes 219 and 220 is either increased or decreased, the average potential on these grids will either increase or decrease, with the positive pulses from the square wave generator 54 increased in time duration the positive portions of the wave 233, shown in Fig. 7 to the left of the zero point 234, will be increased in time duration while to the right of the zero point 234, after the phase has been reversed, the negative portions of the wave will have an increased time duration. There will be then an average higher potential on the grid of the tube 219 and average lower potential on the grid of the tube 220 for the portion of the controlling wave 233 to the left of the zero point 234, and when the phase reverses there will be a lower average potential on the grid of the tube 219 and a higher between the horizontal deflecting plates of the cath- by that portion of the wave to the right of the zero point 234 of Fig. 7.

By adjusting the potentiometer 187, therefore, so as to increase the time duration of the positive pulses produced by the square wave generator 54, a greater difference in potential between the grids of the tubes 219 and 220 is obtained and this will produce a greater deflection of the electron beam to one side or the other for a given movement of the antenna system, and hence greater magnification horizontally of the selected portion of the scanned field will result. If, on the other hand, the time duration of the positive square pulses produced by the square wave generator 54 is decreased by adjusting the potentiometer 187, then the time the individual pulses will remain on the grids of the tubes 219 and 220 will be reduced and there will be less potential difference between these grids. This will produce a less potential difference between the horizontal deflecting plates of the cathode ray tube 40 which will cause the electron beam to move through a smaller horizontal distance for a given movement of the antenna system, and the horizontal magnification of the selected portion of the scanned field will be less. From this it will be seen that the magnification in the horizontal direction of the selected portion of the scanned field may be adjusted within reasonable limits and this adjustment will determine the horizontal dimension of that selected portion of the scanned field. Greater magnification produces a smaller horizontal dimension of the selected portion, while less magnification will permit a larger selected portion to appear on the tube.

In the operation of this system of radio-echo detection the antenna system 10—11 scans continuously about the vertical axis 18 at a substantially fixed vertical elevation, the vertical width of the beam of radiation being sufficient to cover the desired field in the vertical direction. The transmitter 12, under control of the modulator 16, then sends out its pulses of oscillation which radiate from the antenna 10. During the interval between pulses the receiver 14 is connected to the antenna by means of the switch 13, and when a reflected signal is received intensifies the electron beam of the cathode ray tube 22 so as to produce a spot of light on the tube. The sweep generator 24 meanwhile controls the electron beam in the tube 22, so that a radial sweep is produced every time a pulse of electromagnetic radiation is transmitted, and the direction of this radial sweep corresponds at all times to the direction of the antenna system 10—11. By means of the tube 22, therefore, the operator can see the entire scanned field as a map with himself at the center.

If now the operator desires to see a particular portion of this field more in detail, as, for instance, that bounded by the dotted lines 36 and 37 and the dotted lines 38 and 39 of Fig. 2 he will turn the knob 56 until the switch arm 73 rests on a segment 72 which corresponds to the particular angle between the lines 36 and 37, or which includes that particular angle, since the segment selected will be 180 degrees. He will then set the switches 158 and 170, to select one, two, or five mile range marker lines, as desired. When the switch 98 is on the contact 99, the vertical sweep of the electron beam in the tube 40 will start at a point corresponding to the center of the tube of Fig. 2, and when the switch 98 is on the contact 97, the start of the sweep may be delayed by adjusting the variable resistance 95. Therefore, in the example chosen, the operator will set the switch 98 on the contact 97. The adjustment of the resistance 95 may be made to cause the start of the vertical sweep of the electron beam in the tube 40 to correspond to the time when the electron beam in the tube 22 reaches the line 38 of Fig. 2. The ten mile or the five mile sweep may then be obtained by setting the switches 108, 128, and 122 which may be operated by means of a single control element. Thus, the time of this particular portion of the scanning will be reproduced on the tube 40 between the lines 38' and 39' of Fig. 3.

The setting of the knob 56 and the switch arm 73 will control the gate 82 produced by the gate circuit 47 (Figs. 1, 4, and 5) which will prevent any signals being produced on the face of the tube 40 except during the period of the vertical sweep corresponding to the time between the lines 38 and 39 on the face of the tube 22 of Fig. 2. At the same time, the set of the knob 56 will cause the rotor 202 of the rotary transformer 59 to assume such a position that the point of zero amplitude of the varying square wave, which is the output of that rotor, will occur when the antenna system 10—11 is at the center of a particular 180 degrees segment of its scanning rotation which includes the angle of the lines 36 and 37 on the tube 22 of Fig. 2. This will cause the electron beam of the tube 40 to be in the center of the tube when the antenna system 10—11 passes through the center of this section of its rotation. Adjustment of the potentiometer 187 of the square wave generating circuit 54 will adjust the magnification horizontally about the center of the tube.

The signal shown on the face of the tube 22 in Figs. 1 and 2 will thus be spread out on the face of the tube 40 of Figs. 1 and 3, the portions between the lines 38 and 39 of the tube 22 being increased to the portions between the lines 38' and 39' of the tube 40 in Fig. 3, and the portion between the radial lines 36 and 37 of Fig. 2 being spread out to occupy the space between the lines 36' and 37' of Fig. 3. It will thus be seen that better resolution of a portion of the field shown on the face of the tube 22 will be reproduced on the face of the tube 40, making it possible to distinguish the three objects represented by the spots of light 32' on the face of the tube 40 which are seen only as a single object, represented by the single spot of light 32, on the face of the tube 22.

By means of the range marker pips 79 of Fig. 4 the range marker lines 49 are produced on the face of the tube 40 and enable the operator to estimate with considerable accuracy the actual range of the object picked up.

Although the width of the enlarged portion of the image as it appears on the tube 40 between the lines 36' and 37' is limited, as has been explained, by the deflection sensitivity of the tube and the rate of change of amplitude produced by the self-synchronous motors, it may be varied somewhat by varying the width of the positive square wave pulses of the square wave produced by the generator 54. This will vary the time of each particular voltage amplitude on the grids of the power amplifier tubes 219 and 220 in Fig. 6, and this has the effect of changing the average amplitude on these grids. Thus, if the positive square wave pulses are decreased in time duration, the effect is to lower the potentials on the grids of the tubes 219 and 220 for each particular cycle of the square wave, so that the rate of movement of the electron beam across the tube is lessened. On the other hand, if the time duration of those positive square wave pulses is increased, the effect is to raise the average amplitude on the grids of the power tubes 219 and 220 so that the rate of movement of the electron beam is increased. This has the effect of changing the horizontal width of the portion of the field which is enlarged by the auxiliary tube 40 and may be controlled by means of the potentiometer 187 which is in the grid circuits of the tubes 182 and 183.

From the above description it will be evident that we have provided a system of radio-echo detection in which indications of the objects in a relatively large field are represented upon an indicating device, while an auxiliary device simultaneously reproduces a smaller portion of the scanned field, considerably enlarged, which portion may be selected at will by the operator, who may also determine the size of the particular portion selected. By means of this system the operator can not only keep his eye on the large field which the antenna system is scanning, but can also watch a smaller portion of that field at the same time and see that smaller portion in much greater detail.

Many modifications may be made in the arrangement and construction of the various parts and in the various circuits shown and described without departing from the spirit of the invention and we do not desire to limit ourselves to what has been shown and described except as such limitations are included in the appended claims.

What we desire to claim and secure by Letters Patent is:

1. A radio echo detection system, comprising a means for producing a concentrated electromagnetic beam emission, means for scanning said beam emission in a field in space in a predetermined manner, a cathode ray tube, means producing in one direction a repeated linear sweep of the electron beam thereof, a first self-synchronous motor, means rotating the rotor of said motor in synchronism with the scanning movement of said beam emission, means producing an alternating current of constant amplitude, a second self-synchronous motor electrically coupled to said first motor, means applying said alternating current to the rotor of said first motor, means for moving the beam sweep of said cathode ray tube in a direction quadrature to said one direction, said last mentioned means rendered responsive to the amplitude of the output of the rotor of said second motor, means receiving energy reflected from remote objects upon which said beam emission impinges, and means applying said received energy to said cathode ray tube to indicate reception thereof.

2. A radio-echo detection system comprising, means generating pulses of electromagnetic energy, means producing a concentrated beam of said pulsed energy, means turning said beam to scan an area surrounding said system, means receiving energy reflected back from objects upon which said beam impinges, a first cathode ray tube, means applying said received energy to said first cathode ray tube to produce a pattern thereon indicative of the location of such objects in said scanned area, the range and bearing of such objects being respectively indicated by the distance thereto from a center point of said pattern and the angular displacement thereof from a predetermined radial line extending from said center point, means for selecting a portion of said pattern and enlarging the same, said last-mentioned means including a second cathode ray tube, means responsive to said pulse generating means for producing in one direction a repeated linear sweep of the electron beam of said second cathode ray tube, a first self-synchronous motor, means rotating the rotor of said first motor in synchronism with the scanning movement of said beam turning means, means responsive to said pulse generating means producing an alternating voltage of constant amplitude, a second self-synchronous motor electrically coupled to said first motor, means applying said alternating current to the rotor of said first motor, means responsive to the output of the rotor of said second motor for moving said repeated sweep of said second cathode ray tube in a direction perpendicular to said one direction, and means for applying said received energy to said second cathode ray tube to indicate reception thereof.

3. A radio-echo detection system comprising, means generating pulses of electromagnetic energy, means producing a concentrated beam of said pulsed energy, means for scanning said beam emission in a field in space in a predetermined manner, means receiving energy reflected back from objects upon which said beam impinges, a first cathode ray tube, means applying said energy to said first cathode ray tube to produce a pattern thereon indicative of the location of such objects in said field of scan, means for selecting and enlarging a portion of said pattern, said last-mentioned means including, a second cathode ray tube, means producing a repeated triangular wave, means coupled to said pulse generating means controlling the initiation of said triangular wave, means applying said triangular wave to said second cathode ray tube to control the motion of the electric beam thereof in one direction, means operative by said pulse generating means producing an alternating current of constant amplitude, first and second self-synchronous motors being electrically coupled together, means rotating the rotor of said first motor in synchronism with said scanning means, means applying said alternating current to the rotor of said first motor, means responsive to the output of the rotor of said second motor for moving the electron beam of said second cathode ray tube in a direction perpendicular to said one direction, and means for applying said received energy to said second cathode ray tube to indicate reception thereof.

4. A radio-echo detection system comprising, means generating pulses of electromagnetic energy, means producing a concentrated beam of said pulsed energy, means for scanning said beam emission in a field in space in a predetermined manner, means receiving energy reflected back from objects upon which said beam impinges, a first cathode ray tube, means applying said received energy to said first cathode ray tube to produce a pattern thereon indicative of the location of such objects in said field of scan, means for selecting and enlarging a truncated sector of said pattern, said last-mentioned means including, a second cathode ray tube having a control element, means responsive to said pulse generating means generating a repeated linear sweep in one direction on said second cathode ray tube, said linear sweep being initiated at a predetermined time relative to each of the aforesaid pulses and of a controllable slope and duration, means operable by said scanning means for moving said repeated sweep in a direction perpendicular to said one direction, means applying said received energy to said second cathode ray tube to indicate reception thereof, means generating a rectangular pulse of a duration equal to said linear sweep, and means applying said rectangular pulse to said control element of said second cathode ray tube for intensifying the indication on the face thereof during a predetermined portion of each revolution of said scanning means.

5. A radio-echo detection system comprising, means including a modulator for generating pulses of electromagnetic energy, means producing a concentrated beam of said pulsed energy, means scanning said beam emission in a field in space in a predetermined manner, means receiving energy reflected back from objects upon which said beam impinges, a first cathode ray tube, means responsive to said scanning means and said modulator for producing a plan position indication on said first cathode ray tube, means applying said received energy to said first cathode ray tube, means for producing an enlarged replica of a selected truncated sector of said plan position indication, said last-mentioned means comprising a second cathode ray tube having vertical deflection means, means operable by said modulator producing a repeated triangular wave, means coupled to said modulator for controlling the initiation of said triangular wave at a predetermined time after each of said pulses and also controlling the slope and duration thereof, means applying said repeated triangular wave to said vertical deflection means of said second cathode ray tube to control the movement of the electron beam thereof in one direction, the scan of the electron beam of said second cathode ray tube in said one direction corresponding to the range of said truncated sector of said plan position indication of said first cathode ray tube, means operative by said triangular wave generating means producing a rectangular pulse of a duration equal to that of said triangular wave, means responsive to said modulator producing a plurality of equally spaced range markers, means applying said range markers to said second cathode ray tube during the period of said rectangular pulse, means responsive to said modulator producing an alternating current of constant amplitude, first and second self-synchronous motors being electrically coupled together, means rotating the rotor of said first motor in synchronism with said scanning means, means applying said alternating current to the rotor of said first motor, means responsive to the output of the rotor of said second motor for moving the electron beam of said second cathode ray tube in a direction perpendicular to said one direction, the range of movement of the electron beam in said perpendicular direction corresponding substantially to the bearing limits of said truncated sector of said plan position indication on said first cathode ray tube, and means responsive to said scanning means for applying said received energy to said second cathode ray tube throughout the duration of said aforementioned rectangular pulse.

6. In a radio echo object detection system, the combination of means for periodically radiating a directional beam of pulsed electromagnetic energy, means for rotating said beam in space in a predetermined manner, means for receiving pulsed energy reflected from objects in space upon which said beam impinges, a first cathode ray tube, means for controlling the sweep of said cathode ray tube to produce a rotating radial trace whose angular disposition bears a predetermined relationship with the directivity axis of said electromagnetic energy beam, means for applying the received pulsed energy to the control grid of said cathode ray tube, whereby a plan position indication is presented on the screen of said tube of objects detected in said space, means for selecting and enlarging a portion of the plan position indication displayed on said first cathode ray tube, said means including a second cathode ray tube, means for producing a sawtooth wave form of controllable slope and duration a selected time after the radiation of each pulse of electromagnetic energy, means for applying said wave form to the vertical beam deflecting apparatus of said cathode ray tube, first and second self-synchronous motors, means for coupling the rotor of said first motor to said directional beam rotating means whereby said rotor is rotated in synchronism with the directivity axis of said pulsed electromagnetic beam, means for adjusting the angular position of the rotor of said second synchronous motor in accordance with that portion of the plan position indication displayed in said first cathode ray tube which is to be enlarged, means for interconnecting the stator windings of said first and second self-synchronous motors, means for generating a variable length positive pulse a selected time after the radiation of each electromagnetic energy pulse and for coupling said positive pulse to the rotor winding of said first self-synchronous motor whereby a sinusoidally modulated train of square wave pulses is produced at the rotor winding of said second synchronous motor, the amplitude of the square waves forming said train passing through zero and suffering a phase reversal when the rotors of said first and second synchronous motors are in relative angular alignment, means for deriving from said train a stepped voltage wave and means for applying said stepped voltage wave to the horizontal beam deflecting apparatus of said second cathode ray tube.

7. In a system as defined in claim 6, means for controlling the intensity of the cathode ray beam of said second cathode ray tube whereby only received pulses from objects within a selected 180° area of space scanned by said rotating directional beam of pulsed electromagnetic energy can illuminate the face of said second cathode ray tube.

8. In a system as defined in claim 7 wherein said last-mentioned means includes a commutator member secured to the rotor of said first self-synchronous motor, said member being comprised of a plurality of stacked semicircular conductive segments, adjacent segments being angularly offset by predetermined amounts, said second commutator being composed of a like plurality of insulated arcuated segments arranged in a circle with each of said last-mentioned arcuated segments being electrically interconnected to one of said semi-circular segments of said first commutator, a wiper for said second commutator positioned by the rotor of said second synchronous motor, means for applying an operating potential to all of said semi-circular segments whereby a potential is available at the wiper of said second commutator for an interval corresponding to the time for said directional beam of energy to rotate a given 180° of space, a gate circuit connected to the control grid of said second cathode ray tube, said gate circuit being coupled to said wiper and deriving its operating potential therefrom whereby said gate circuit is conditioned for operation during the above interval.

References Cited in the file of this patent

UNITED STATES PATENTS

| | | |
|---|---|---|
| 1,832,809 | Hudson | Nov. 17, 1931 |
| 2,121,359 | Luck et al. | June 21, 1938 |
| 2,231,929 | Lyman | Feb. 18, 1941 |
| 2,241,809 | De Forest | May 13, 1941 |
| 2,312,761 | Hershberger | Mar. 2, 1943 |
| 2,355,363 | Christaldi | Aug. 8, 1944 |
| 2,395,966 | Goldberg | Mar. 5, 1946 |
| 2,401,432 | Luck | June 4, 1946 |
| 2,405,238 | Seeley | Aug. 6, 1946 |
| 2,408,415 | Donaldson | Oct. 1, 1946 |
| 2,421,747 | Englehardt | June 10, 1947 |
| 2,429,809 | Fyler | Oct. 28, 1947 |

FOREIGN PATENTS

| | | |
|---|---|---|
| 520,778 | Great Britain | May 3, 1940 |